US008917294B2

(12) United States Patent
Tsai

(10) Patent No.: US 8,917,294 B2
(45) Date of Patent: Dec. 23, 2014

(54) COLOR SPACE MATCHING OF VIDEO SIGNALS

(75) Inventor: Leonard Tsai, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 601 days.

(21) Appl. No.: 13/378,360

(22) PCT Filed: Mar. 11, 2009

(86) PCT No.: PCT/US2009/036831
§ 371 (c)(1),
(2), (4) Date: Dec. 14, 2011

(87) PCT Pub. No.: WO2010/104506
PCT Pub. Date: Sep. 16, 2010

(65) Prior Publication Data
US 2012/0139973 A1 Jun. 7, 2012

(51) Int. Cl.
G09G 5/10 (2006.01)
H04N 1/60 (2006.01)
H04N 9/67 (2006.01)
(52) U.S. Cl.
CPC . *H04N 9/67* (2013.01); *H04N 1/603* (2013.01)
USPC ............................. 345/690; 345/604; 345/590
(58) Field of Classification Search
CPC ............ H04N 9/67; H04N 1/603; G09G 5/02
USPC .................................................... 345/204, 88
See application file for complete search history.

(56) References Cited

U.S. PATENT DOCUMENTS

| | | | |
|---|---|---|---|
| 6,421,094 B1 | 7/2002 | Han | |
| 6,600,747 B1 | 7/2003 | Sauber | |
| 6,697,033 B1 | 2/2004 | Leung et al. | |
| 6,791,620 B1 | 9/2004 | Elswick et al. | |
| 6,903,753 B1 | 6/2005 | Gray, III et al. | |

(Continued)

FOREIGN PATENT DOCUMENTS

| KR | 2008-0019792 A | 3/2008 |
|---|---|---|
| WO | WO2006/113776 | 10/2006 |

OTHER PUBLICATIONS

ISA/KR, International Search Report dated Dec. 17, 2009, PCT/US2009/036831 filed Mar. 11, 2009.

(Continued)

*Primary Examiner* — Amare Mengistu
*Assistant Examiner* — Sarvesh J Nadkarni

(57) ABSTRACT

A system for color space matching a plurality of signals is provided. The system can include a first and second sources operably connected to a first and second inputs, respectively. The first and second inputs can be operably connected to a switch (140). An external device identification (EDID) module (155) can be operably connected to the switch. A controller (150), having a plurality of display modes, can also be operably connected to the switch. Each of the plurality of display modes can have a corresponding unique EDID data structure stored in the EDID module, thereby providing a plurality of unique EDID data structures within the EDID module. The EDID module can select a single unique EDID data structure based upon the color space format of the second signal (125), and in response to the selection, the first source (190) can convert the first color space of the first signal (110) to the second color space format.

15 Claims, 4 Drawing Sheets

(56) References Cited

U.S. PATENT DOCUMENTS

| | | |
|---|---|---|
| 6,940,523 B1 | 9/2005 | Evoy |
| 6,943,753 B2 | 9/2005 | Shirasaki et al. |
| 7,030,932 B2 | 4/2006 | Han |
| 7,136,042 B2 | 11/2006 | Magendanz et al. |
| 7,138,989 B2 | 11/2006 | Mendelson et al. |
| 7,206,025 B2 | 4/2007 | Choi |
| 7,236,181 B2 | 6/2007 | Ho et al. |
| 7,242,370 B2 | 7/2007 | Ouchi et al. |
| 7,250,979 B2 | 7/2007 | Choi |
| 7,298,379 B2 | 11/2007 | Xu et al. |
| 7,336,392 B2 | 2/2008 | Kakutani |
| 7,358,928 B2 | 4/2008 | Mori et al. |
| 7,366,886 B2 | 4/2008 | Yoo |
| 7,394,929 B2 | 7/2008 | Lim et al. |
| 7,453,601 B2 | 11/2008 | Kurumisawa et al. |
| 2001/0050679 A1* | 12/2001 | Shigeta .................. 345/204 |
| 2004/0027357 A1* | 2/2004 | Mendelson et al. .......... 345/581 |
| 2004/0150650 A1* | 8/2004 | Mendelson et al. .......... 345/589 |
| 2005/0080939 A1 | 4/2005 | Onuma et al. |
| 2005/0232030 A1 | 10/2005 | Mawatari et al. |
| 2005/0285883 A1 | 12/2005 | Chen |
| 2006/0017751 A1 | 1/2006 | Shintani et al. |
| 2006/0114248 A1 | 6/2006 | Lee et al. |
| 2007/0186015 A1 | 8/2007 | Taft et al. |
| 2007/0274689 A1 | 11/2007 | Stone |
| 2008/0211830 A1* | 9/2008 | Abe et al. .................. 345/604 |
| 2008/0259216 A1* | 10/2008 | Yoshida et al. ............. 348/649 |
| 2008/0259370 A1 | 10/2008 | Matsumoto et al. |
| 2009/0086089 A1* | 4/2009 | Matsui et al. ............... 348/441 |

OTHER PUBLICATIONS

EPO, Extended Search Report dated Aug. 24, 2012, App. No. 09841619.1, filed Aug. 31, 2011.

* cited by examiner

COLOR SPACE MATCHING OF VIDEO SIGNALS

BACKGROUND OF THE INVENTION

1. Field of the Invention

Embodiments of the present invention generally relate to signal processing. More specifically, embodiments of the present invention relate to video signal processing.

2. Description of the Related Art

Video display devices are rapidly becoming the Swiss Army knife of the 21st century. Their use as a television screen, video display device for gaming systems, video display device for audio-visual entertainment and as a video display device for computational devices makes the utilitarian nature of the video display device readily apparent.

Quite frequently, however, various devices capable of providing a video signal to the video display device will transmit the signal in a variety of color space formats. The color space of a device along with device profiling, allow reproducible representations of color, in both analog and digital representations. The disparate color space formats can make it difficult or impossible to display data from multiple video sources simultaneously on a single display device. For example, the display of two video signals in a picture-in-picture format on a single display device.

SUMMARY OF THE INVENTION

A system for color space matching a plurality of signals is provided. The system can include a first and second sources operably connected to a first and second inputs, respectively. The first and second inputs can be operably connected to a switch. An extended display identification (EDID) module can be operably connected to the switch. A controller, having a plurality of display modes, can also be operably connected to the switch. Each of the plurality of display modes can have a corresponding unique EDID data structure stored in the EDID module, thereby providing a plurality of unique EDID data structures within the EDID module. The EDID module can select a single unique EDID data structure based upon the color space format of the second signal, and in response to the selection, the first source can convert the first color space of the first signal to the second color space format.

A method for color space matching a plurality of signals is also provided. A first source can provide a first signal, having a first color space format, to a first input. A second source can similarly provide a second signal, having a second color space format, to a second input. The first and second signals can be introduced to a switch which is operably connected to the first input and to the second input. A controller having a plurality of display modes can be operably connected to the switch. Each display mode can be associated with a unique EDID data structure, thereby providing a plurality of unique EDID data structures commensurate with the plurality of display modes. The plurality of unique EDID data structures can be disposed in, in, or about and EDID module operably connected to the switch. A single, unique EDID data structure can be selected based upon the color space format of the second signal. The color space format of the first signal can be converted by the first source to the second color space format in responded to the selection of the single unique EDID data structure.

As used herein, the term "video signal" can refer to any signal, analog or digital, containing, all or in part, video information.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic circuit, software, or other entity. Logical and/or physical communication channels can be used to create an operable connection.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
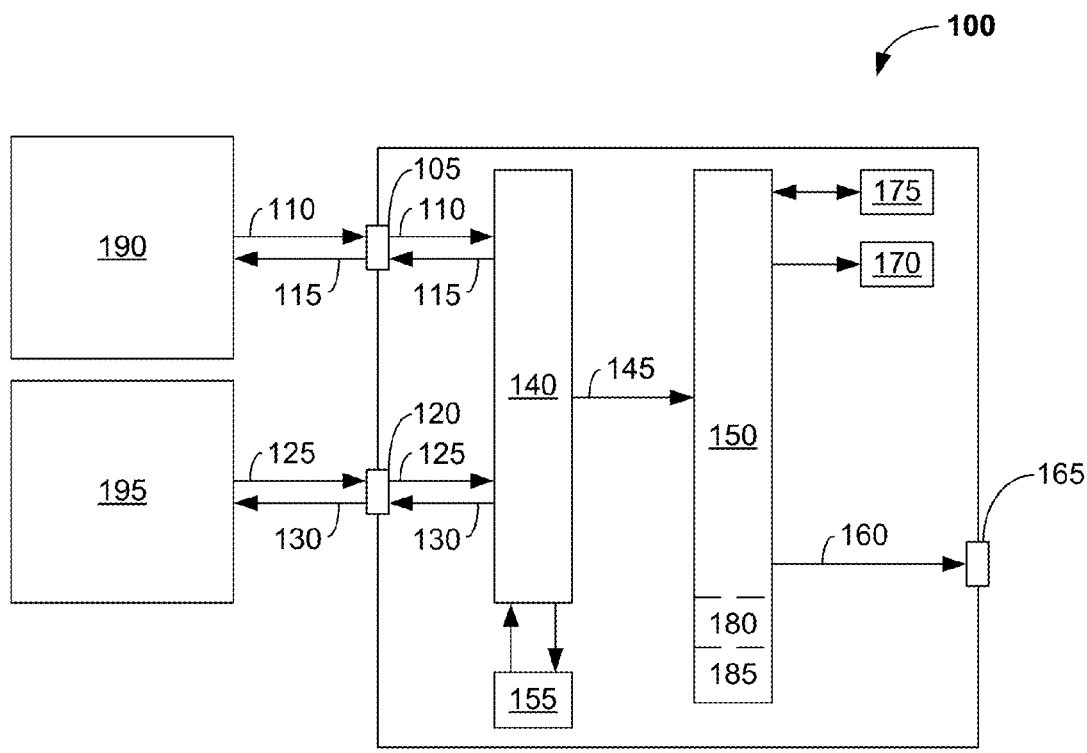
FIG. 1 is a schematic depicting an illustrative system for color space matching of video signals, according to one or more embodiments described herein.

FIG. 1 is a schematic depicting an illustrative system 100 for color space matching of video signals, according to one or more embodiments. In one or more embodiments, a first input 105 and a second input 120 can be operably connected to a switch 140. The switch 140 can, in turn, be operably connected to a controller 150. One or more Extended Display Identification ("EDID") modules 155 can also be operably connected to the switch 140. The controller 150 can be operably connected to a video output 165. The controller 150 can also be operably connected to one or more dynamic random access memory ("DRAM") modules 170 and one or more flash memory modules 175. In one or more embodiments, one or more color space converters (two such color converters are depicted in FIG. 1: 180 and 185) can be disposed in, on, or about the controller 150 and/or the EDID module 155. In one or more embodiments, a first source 190 can be bi-directionally, operatively connected to the first input 105. In one or more embodiments, a second source 195 can be bi-directionally, operatively connected to the second input 120.

In one or more embodiments, the first source 190 can provide a first signal 110 to the switch 140 via the first input 105. The first signal 110 can contain, in part or in whole, video image data. The video image data disposed within the first signal 110 can be communicated in a first color space format. In one or more embodiments, one or more signals 115 can be communicated from the switch 140 to the first source 190 via the first input 105. In one or more embodiments, the first signal 110 can include, in whole or in part, video data. In one or more embodiments, the first signal 110 can include, in whole or in part, data in analog or digital format.

In one or more embodiments, the first input 105 can be any connector suitable for providing one or more operable connections between the switch 140 and the first source 190. The first input 105 can include one or more individual conduits or connectors. In one or more embodiments, the first input 105 can comprise one or more modular connectors compliant with one or more industry standards applicable to video transmission cables or devices. Exemplary first inputs 105 can include, but are not limited to: one or more RCA type coaxial connectors; one or more S-Video multi-conductor connectors; one or more Digital Video Interface ("DVI"); one or more High Definition Multimedia Interface ("HDMI"); one or more Video Graphics Array ("VGA") multi-conductor connectors; one or more IEEE 1394 ("Firewire" or "iLink") multi-conductor connectors; or any combination thereof.

In one or more embodiments, the second source 195 can provide a second signal 125 to the switch 140 via the second input 120. The second signal 125 can be communicated from the second source 195 to the switch 140 in a second color space format. In one or more embodiments, one or more signals 130 can be communicated from the switch 140 to the second source 195 via the second input 120. In one or more embodiments, the second signal 125 can include, in whole or in part, video data. In one or more embodiments, the second signal 125 can include, in whole or in part, data in analog or digital format.

In one or more embodiments, the second input 120 can be any connector suitable for providing one or more operable connections between the switch 140 and the second source 195. The second input 120 can include one or more individual conduits or connectors. In one or more embodiments, the second input 120 can comprise one or more modular connectors compliant with one or more industry standards applicable to video transmission cables or devices. Exemplary second inputs 120 can include, but are not limited to: one or more RCA type coaxial connectors; one or more S-Video multi-conductor connectors; one or more Digital Video Interface ("DVI"); one or more High Definition Multimedia Interface ("HDMI"); one or more Video Graphics Array ("VGA") multi-conductor connectors; one or more IEEE 1394 ("Firewire" or "iLink") multi-conductor connectors; or any combination thereof.

In one or more embodiments, the switch 140 can be operatively connected to the EDID module 155. In one or more embodiments, the EDID module can contain a plurality of EDID data structures. Each of the plurality of EDID data structures can correspond to one or more unique color space configurations. In one or more embodiments, each of the plurality of EDID data structures can include one or more capabilities of a display device connected to the system 100. In one or more embodiments, each of the plurality of EDID data structures can include information such as the display device manufacturer, the display device product type, the display device phosphor or filter type, the timings supported by the display device, the display size, the display device luminance data, the display device pixel mapping data, or any combination thereof. In one or more embodiments, each of the plurality of EDID data structures can be communicated using one or more industry standard protocols, for example the standards published by the Video Electronics Standards Association ("VESA"). In one or more embodiments, the each of the plurality of EDID data structures can be 128 byte structures compliant with EDID structure versions 1.0, 1.1, 1.2, or 1.3. In one or more embodiments, the each of the plurality of EDID data structures can be 256 byte structures compliant with EDID structure versions 2.0, or any subsequent EDID structure version.

In one or more embodiments, all or a portion of the EDID data structure communicated from the EDID module 155 to the switch 140 can be communicated to the first source 190 via the one or more signals 115. In one or more specific embodiments, the one or more signals 115 can be communicated using a display data channel ("DDC"). In one or more specific embodiments, the one or more signals 115 can be communicated via a DDC using the I²C bus specification. In one or more specific embodiments, the one or more signals 115 can be communicated using an Enhanced Display Data Channel (E-DDC) compliant with the HDMI standard.

In one or more embodiments, all or a portion of the EDID data structure communicated can be communicated from the switch 140 to the second source 195 via one or more signals 130. In one or more specific embodiments, the one or more signals 130 can be communicated using a DDC. In one or more specific embodiments, the one or more signals 130 can be communicated via a DDC using the I²C bus specification. In one or more specific embodiments, the one or more signals 130 can be communicated using an E-DDC in accordance with the HDMI standard. In one or more embodiments, the same EDID data structure can be communicated from the EDID module 155 to the first source 190 and the second source 195. In one or more embodiments, different EDID data structures can be communicated from the EDID module 155 to the first source 190 and the second source 195.

In one or more embodiments, the switch 140 can be operably connected to the controller 150 via one or more connections, conduits, conductors, or any combination thereof. In one or more embodiments, all or a portion of the first signal 110 can be transmitted via one or more operable connections between the switch 140 and the controller 150. In one or more embodiments, all or a portion of the second signal 125 can be transmitted via one or more operable connections between the switch 140 and the controller 150. In one or more embodiments, all or a portion of the first signal 110 can be mixed, multiplexed, or otherwise combined with all or a portion of the second signal 125 prior to being transmitted or otherwise introduced to the controller 150.

In one or more embodiments, the switch 140 can be any system, device, or any combination of systems and/or devices suitable for receiving one or more signals via a plurality of inputs and transmitting one or more signals 145 via one or more outputs. In one or more embodiments, the switch 140 can be suitable for handling analog signals, digital signals, or any combination of analog and/or digital signals. In one or more embodiments, the switch 140 can permit bi-directional communication via all or a portion of the plurality of inputs to the switch. In one or more embodiments, the switch 140 can permit bi-directional communication of one or more signals 145 via all or a portion of the one or more outputs. In one or more embodiments, the switch 140 can be an HDMI compliant switch having an unlimited number of signal inputs and a single signal output. In one or more specific embodiments, the switch 140 can be an HDMI compliant switch having two or more signal inputs; three or more signal inputs; four or more signal inputs; or five or more signal inputs. In one or more embodiments, the switch 140 can be a stand-alone device. In one or more embodiments, the switch 140 can be a chip-mounted device disposed in, on, or about a computing device.

As used herein, the term "computing device" can refer to any device having one or more processors capable of executing one or more sets of instructions. The one or more sets of instructions can be embedded code, for example code programmed into an EEPROM or flash memory module disposed within the device. The one or more sets of instructions can include all or in part, one or more user supplied instruction sets, for example user inputs to a routine executed on the device. Exemplary computing devices can include, but are not limited to, handheld computing devices, such as portable digital assistants ("PDAs"); cellular telephones, cellular computing devices, and the like; portable computers, such as laptop computers, "netbook" computers, and the like; desktop computers; computer workstations; all-in-one computers; electronic devices having video display capabilities, such as televisions, digital picture frames, digital projection systems, and the like.

In one or more embodiments, the controller 150 can be operably connected to one or more video outputs 165. In one or more embodiments, the controller 150 can be operably connected to one or more DRAM modules 170. In one or more embodiments, the controller 150 can be operably connected to one or more DRAM modules 170 and/or one or more flash memory modules 175. In one or more embodiments, one or more color conversion matrices (two are depicted in FIG. 1, 180 and 185) can be disposed in, on, or about the controller 150. In one or more embodiments, at least one of the color conversion matrices 180 and 185 can be suitable for the conversion of the RGB or sRGB color space to the YUV color space. In one or more embodiments, the controller 150 can include, but is not limited to, one or more flat panel controllers.

In one or more embodiments, the controller 150 can convert all or a portion of a signal 145 provided by the switch 140 to a signal 160. In one or more embodiments, at least one of the one or more color conversion matrices 180 and 185 can be used in whole or in part to provide all or a portion of the signal 160. For example, the controller 150 can convert all or a portion of the signal 145 in the YUV color space to the signal 160 in the RGB or sRGB color space. In one or more embodiments, the controller 150 can perform additional signal processing functions, including, but not limited to, scaling, contrast, brightness, switching video inputs, gamma control, and the like, prior to introducing the signal 160 to one or more signal outputs 165.

Figure 2:
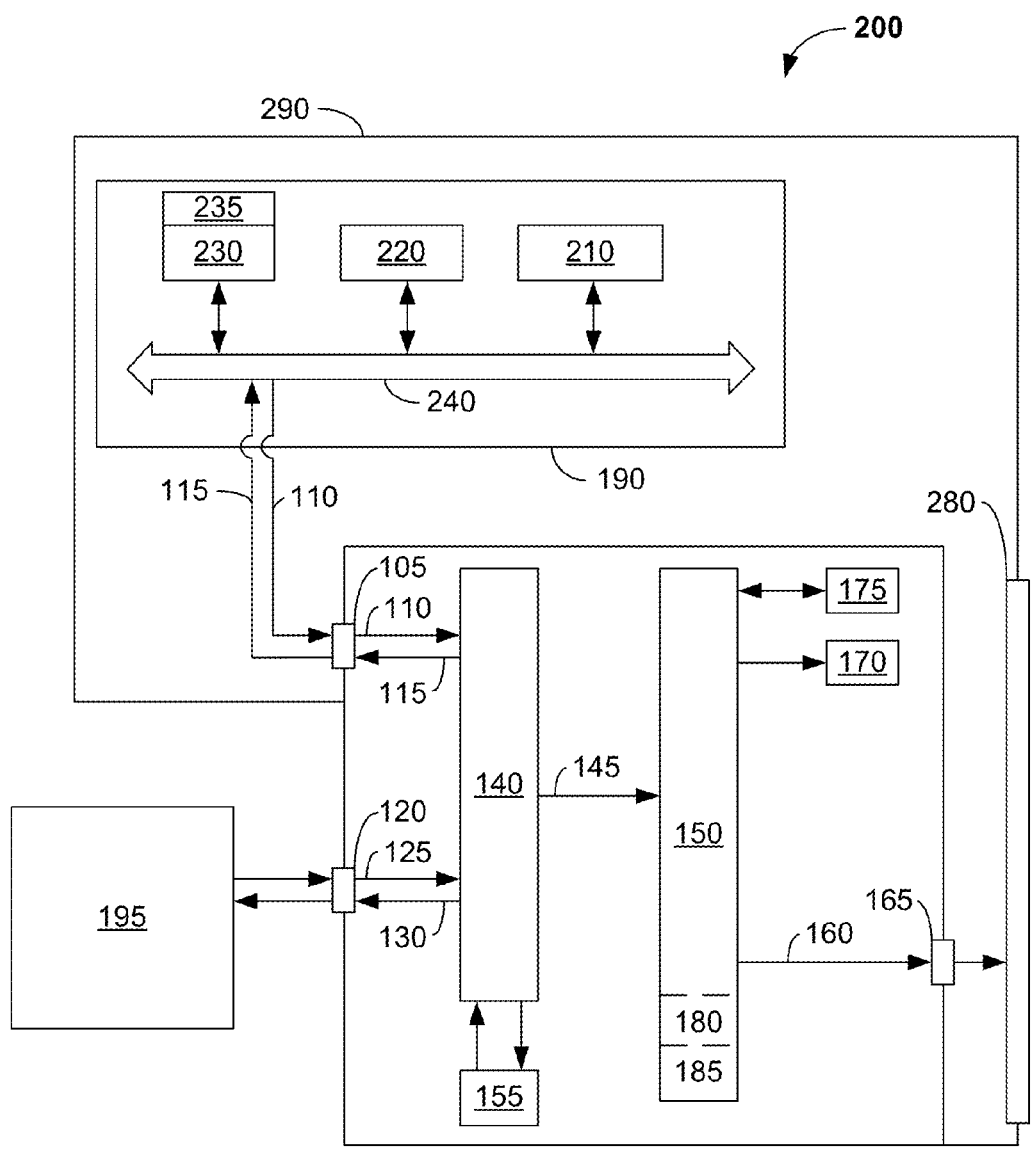
FIG. 2 is a schematic depicting an illustrative system using the illustrative system depicted in FIG. 1 for color space matching of two video signals, according to one or more embodiments described herein.

FIG. 2 is a schematic depicting an illustrative system 200 using the illustrative system 100 depicted in FIG. 1 for color space matching of two video signals (110, 125), according to one or more embodiments. In one or more embodiments, the first source 190 can be a portable, stationary, or handheld computing device. In one or more embodiments, one or more first source 190 can be a computing device including, but not limited to, one or more central processing units ("CPUs") 210, a system memory 220, one or more graphical processors 230, or any combination thereof. In one or more specific embodiments, the one or more the one or more graphical processors 230 can be disposed in, on, or about the one or more CPUs 210. In one or more embodiments, the one or more CPUs 210, system memory 220, and graphical processors 230 can be bi-directionally, operatively connected using one or more busses 240.

In one or more embodiments, the system 200 can include one or more display devices 280 operably connected to the one or more video outputs 165. In one or more embodiments, all or a portion of the first signal 110 can be provided to the switch 140 via the one or more busses 240. In one or more embodiments, all or a portion of the one or more CPUs 210, one or more RAM modules 220, one or more graphical processing units 230, one or more busses 240, the display device 280, and the one or more color space matching systems 100 can be partially or completely disposed in, on, or about a housing 290.

In one or more embodiments, the one or more CPUs 210 can include one or more devices, systems, or any combination of systems and/or devices suitable for execution of one or more instruction sets. In one or more embodiments, the one or more CPUs 210 can be a dedicated device such as one of the family of Intel Pentium, Celeron, Xeon, Itanium microprocessors, or the like. In one or more embodiments, the one or more CPUs 210 can be a portion of a device such as a RISC based processor in a simple electronic device, or the like. In one or more embodiments, the one or more CPUs 210 can be operably connected with the one or more memory modules 220, and/or then one or more graphical processors 230 via the one or more busses 240. In one or more embodiments, the one or more processors 210 can receive all or part of the one or more signals 115 transmitted from the first input 105 via the one or more busses 240. In one or more embodiments, the one or more CPUs 210 can include, but is not limited to, one or more 8-bit CPUs; one or more 16-bit CPUs; one or more 32-bit CPUs, one or more 64-bit CPUs, one or more 128-bit CPUs; one or more 256-bit CPUs; one or more 512-bit CPUs; one or more 1024-bit CPUs; one or more 2048-bit CPUs; or any combination thereof.

The system memory 220 can include one or more devices, systems, or any combination of systems and/or devices suitable for the temporary or permanent storage of digital data. In one or more embodiments, the system memory 220 can include computer storage media in the form of volatile and/or nonvolatile memory such as read only memory (ROM) and/or random access memory (RAM). A basic input/output system (BIOS), containing the basic routines that help to transfer information between elements within the computing device 190, for example during start-up, can be stored in ROM. RAM can contain data and/or program modules that are immediately accessible to and/or presently being operated on by the one or more CPUs 210. In one or more embodiments, the system memory 220 can receive all or part of the one or more signals 115 transmitted from the first input 105 via the one or more busses 240. In one or more embodiments, the system memory 220 can be partially or wholly physically and/or electrically detachable or otherwise removable from the computing device 190.

The one or more graphical processors 230 can include one or more devices, systems, or any combination of systems and/or devices suitable for the conversion of digital data communicated by the one or more CPUs 210 and/or the system memory 220 into one or more video signals. The one or more graphical processors 230 can be combined, in whole or in part, with the one or more CPUs 210 and/or the system memory 220. In one or more embodiments, the one or more graphical processors 230 can be a dedicated graphics rendering device disposed in, on, or about a computing device 190, such as a personal computer, a workstation, a game console, or the like.

In one or more embodiments, one or more color conversion matrices 235 can be disposed in, on, or about the graphics processor 230. The one or more color conversion matrices can include one or more conversion algorithms. In one or more embodiments, the one or more color conversion matrices 235 can include one or more tables, algorithms or combinations thereof suitable for converting an incoming signal from a first color space format to a second color space format. In one or more specific embodiments, the one or more color conversion matrices 235 can include one or more RGB to xvYcc conversion matrices, one or more sRGB to xvYcc conversion matrices, one or more RGB to high color xvYcc conversion matrices, one or more sRGB to high color xvYcc conversion matrices, or the like. In one or more specific embodiments, the one or more color conversion matrices 235 can include one or more YUV to xvYcc conversion matrices, one or more YUV to high color xvYcc conversion matrices, or the like. In one or more specific embodiments, the one or more color conversion matrices 235 can include, but are not limited to, one or more matrices capable of converting an RGB, sRGB, or YUV input signal to an xvYcc or high color xvYcc output signal.

The one or more busses 240 can include one or more devices, systems, or any combination of systems and/or devices suitable for the transmission or conveyance of digital data between one or more systems and/or devices, for example one or more CPUs 210, system memory 220, one or more graphical processors 230, or any frequency and/or combination thereof. The one or more busses 240 can convey digital data in serial fashion or in parallel fashion. In one or more embodiments, the one or more graphical processors 230 can transmit all or part of the first signal 110 to the first input 105 via the one or more busses 240. In one or more embodiments, the one or more graphical processors 230 can receive all or part of the one or more signals 115 transmitted from the first input 105 via the one or more busses 240. In one or more embodiments, the one or more busses can include one or more parallel busses having a width of: 8-bits or greater; 16-bits or greater; 32-bits or greater; 64-bits or greater; 128-bits or greater; 256-bits or greater; or 512-bits or greater.

The one or more display devices 280 can include one or more systems, devices, or any combination of systems and/or devices suitable for the display of one or more video images. The one or more display devices 280 can include, but are not limited to, one or more gas plasma display devices, one or more liquid crystal display ("LCD") display devices, one or more light emitting diode ("LED") display devices, one or more cathode ray tube ("CRT") display devices, one or more organic LED ("OLED") display devices, one or more surface conduction electron-emitter ("SED") display devices, or the like. The one or more display devices 280 can be disposed in whole or in part in, on, or about the housing 290. In one or more embodiments, the one or more display devices 280 can include, but are not limited to, display devices having a diagonal dimension of 5 inches (12.7 cm) or more; 8 inches (20.3 cm) or more; 12 inches (30.5 cm) or more; 19 inches (48.3 cm) or more; 24 inches (61 cm) or more; 36 inches (91.4 cm) or more; 48 inches (122 cm) or more; or 60 inches (152.4 cm) or more.

In one or more embodiments, the one or more display devices 280 can be suitable for the display of a video signal having any color space format. In one or more embodiments, the one or more display devices 280 can be suitable for the display of a video signal in a single color space format, for example a video signal in an RGB, sRGB, YUV, or xvYcc color space format. In one or more specific embodiments, the one or more display devices 280 can be suitable for the display of a video signal in a plurality of color space formats, for example a video signal having either an RGB, sRGB, YUV, or xvYcc color space format.

In one or more embodiments, the housing 290 can include any system, device, or any combination of systems and/or devices suitable for partially or completely housing all or a portion of the one or more color space matching system 100, one or more CPUs 210, system memory 220, one or more graphical processors 230, busses 240, and one or more display devices 280. In one or more embodiments, the housing 290 can include, but is not limited to, a portable computer case, a laptop computer case, a "netbook" computer case, a desktop computer case, a workstation computer case, or the like. In one or more specific embodiments, the housing can include an "all-in-one" computer case having at least the display and motherboard mounted, in whole or in part, within a single housing 290.

Figure 3:
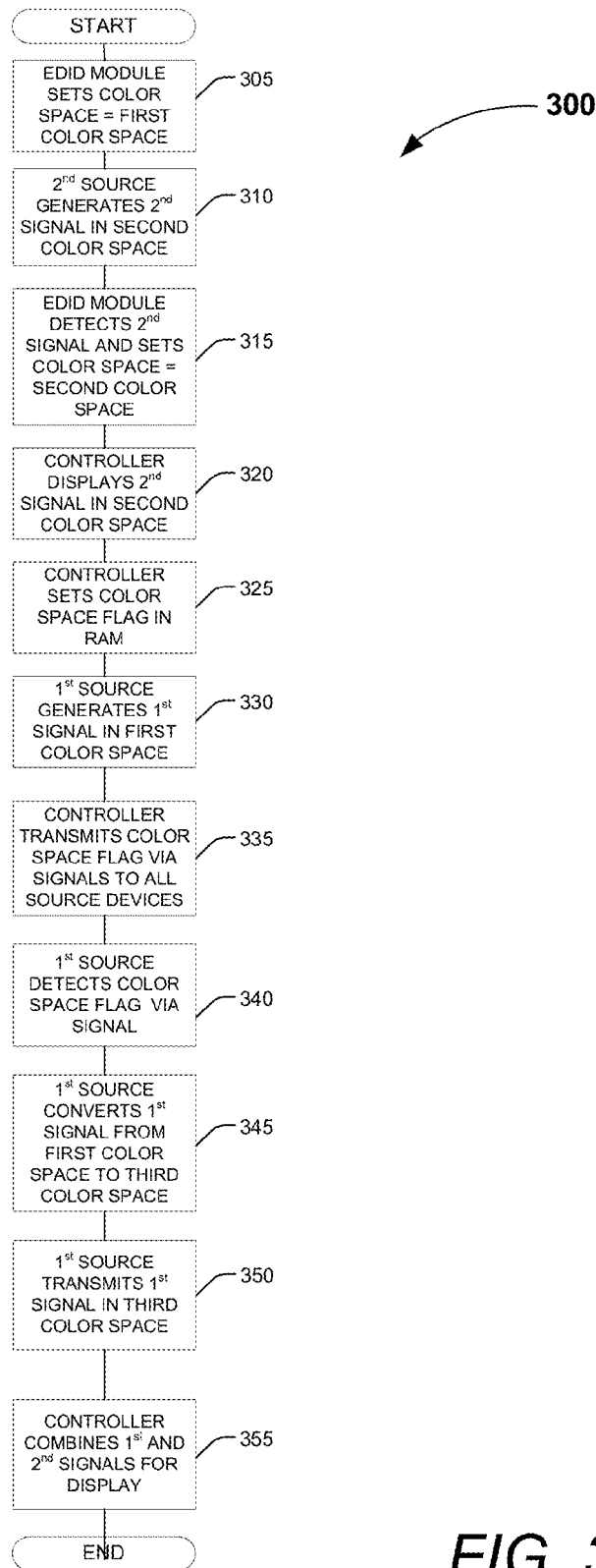
FIG. 3 is a logic flow diagram depicting an illustrative method for color space matching of two video signals using the system depicted in FIG. 1, according to one or more embodiments described herein.

FIG. 3 is a logic flow diagram 300 depicting an illustrative method for color space matching of two video signals using the system depicted in FIG. 1, according to one or more embodiments. In one or more embodiments, in step 305, the one or more EDID modules 155 can set the color space of the controller 150 and display device 280 to a first color space. By setting the color space of the controller 150 and display device 280 to a first color space the EDID module 155 can indicate the color space capabilities of the controller 150 and display device 280 to one or more external devices connected to the first input 105 and the second input 125.

An exemplary second source 195, for example a HDMI compliant device such as a Blu-ray® DVD player, can be connected to the second input 120. In step 310, the second source 195 can generate a second signal 125 having a second color space. In one or more embodiments, the second color space can be the same or different as the first color space. Sensing the presence of the second color space formatted second signal 125 in step 315, the one or more EDID modules 155 can reset the color space of the controller 150 and display device 280 to match the second color space format.

The controller 150, sensing the second color space format of the second signal 125, can in step 320 display the second signal 125 in the second color space on the display device 280. The controller 150 can additionally, in step 325 set one or more color space flags in the RAM module 170 indicating that the display is now operating in the second color space.

In step 330, the first source 190 can generate a first signal 110 in the first color space. In one or more specific embodiments, the first signal 110 can be intended for co-current display with the second signal 125 on the display device 280, for example as a picture-in-picture ("PIP") display. The first source 190 can, in one or more embodiments, be include one or more devices capable of receiving the signal 115, for example a computing device such as a handheld, laptop, desktop, or all-in-one computing device.

In step 335, the controller 150 can transmit a signal 115 indicating, among other things, the status of the color space flag in the RAM module 170. In one or more embodiments, the first source 190 can, in step 340, detect presence of the signal 115 and the presence of the color space flag transmitted within the signal 115. In one or more specific embodiments, the signal 115 can be transmitted from the controller 150 to the first source 190 via one or more DDC or E-DDC channels. Based upon the presence of the color space flag in the signal 115, the first source 190 can determine that the controller 150 and display device 280 are operating in the second color space.

In response to the transmission of the color space flag via the signal 115, the first source 190 can convert all or a portion of the first signal 110 from the first color space to the third color space in step 345. In one or more embodiments, the conversion of the first signal 110 from the first color space to the third color space can be performed all or in part via the one or more color conversion matrices 235. In one or more embodiments, the third color space and the second color space can be identical, for example the second and third color space formats can both be the xvYcc color space format. In one or more embodiments, the third color space and the second color space can be different. In one or more specific embodiments, the second and third color spaces can include, but are not limited to, the xvYcc color space.

The first source 190 can then, in step 350, transmit the first signal 110, now in the third color space, to the first input 105. The controller 150, in step 355, can display the combined first signal 110 and second signal 125 on the display device 280.

Figure 4:
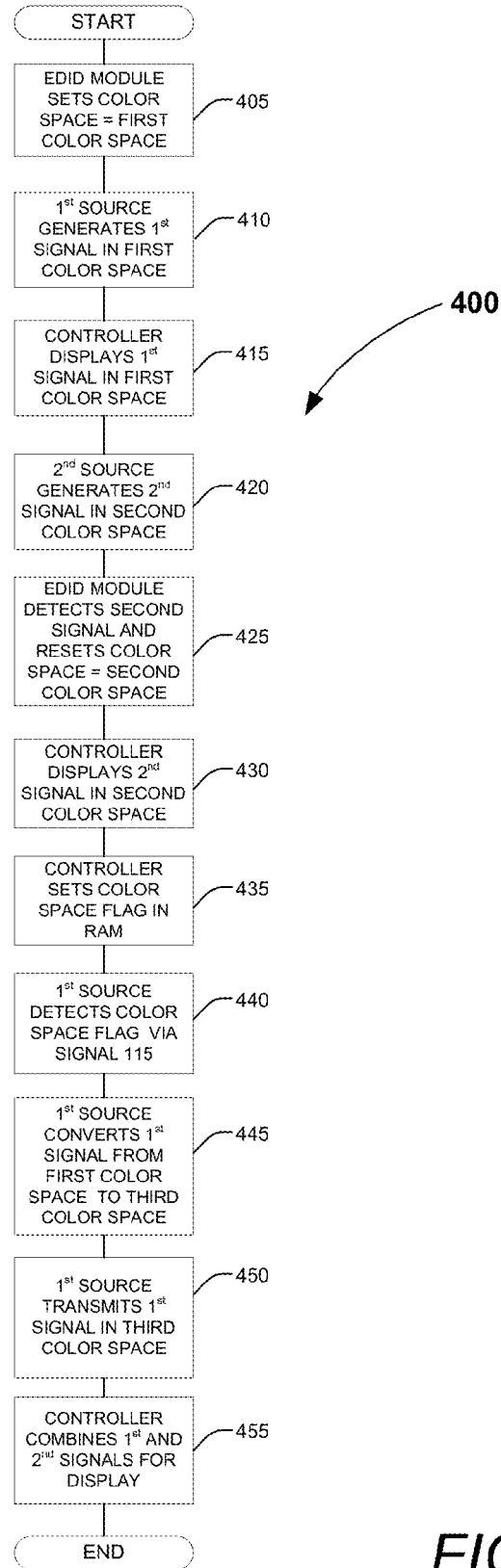
FIG. 4 is a logic flow diagram depicting another illustrative method for color space matching of two video signals using the system depicted in FIG. 1, according to one or more embodiments

FIG. 4 is a logic flow diagram 400 depicting another illustrative method for color space matching of two video signals using the system depicted in FIG. 1, according to one or more embodiments. In one or more embodiments, the one or more EDID modules 155 can set the color space of the controller 150 and the display device 280 to a default, first color space, as depicted in step 405. A first source 190, for example a computing device such as a handheld, laptop, desktop, or all-in-one computer, can, in step 410, generate a first signal 110 in the first color space. The first signal 110 can be introduced to the first input 105, then to the controller 150. In one or more embodiments, the controller 150, in step 415, can display the first signal, in the first color space, using the one or more display devices 280.

In one or more embodiments, an exemplary second source 195, for example a HDMI compliant device such as a Blu-ray® DVD player, can be operably connected to the second input 120. In step 420, the second source 195 can generate a second signal 125 in a second color space. In one or more specific embodiments, the second signal 125 can be intended for co-current display with the first signal 110 on the display device 280, for example as a PIP display. In one or more embodiments, by sensing the presence of the second color space second signal 125 in step 425, the one or more EDID modules 155 can reset the color space of the controller 150 and display device 280 to the second color space. In one or more embodiments, the controller 150 can, in step 430, display the second signal 120 in the second color space using the one or more display devices 280.

In one or more embodiments, in step 435, the controller 150 can also set one or more color space flags in the RAM module 170 to indicate that the display device 280 is now operating in the second color space. In one or more embodiments, the status of the one or more color space flags in the RAM module 170 can be transmitted to the first source 190 via signal 115 and to the second source 195 via signal 130. In one or more specific embodiments, the signal 115 can be transmitted from the controller 150 to the first source 190 via one or more DDC or E-DDC channels. In one or more embodiments, the first source 190 can, in step 440, detect the presence of the color space flag, indicating the controller 190 and the display device 280 are operating in the second color space.

In response to the transmission of the color space flag via the signal 115, the first source 190 can convert all or a portion of the first signal 110 from the first color space to the third color space in step 445. In one or more embodiments, the third color space and the second color space can be identical, for example the second and third color space formats can both be the xvYcc color space format. In one or more embodiments, the third color space and the second color space can be different. In one or more specific embodiments, the second and third color spaces can include, but are not limited to, the xvYcc color space.

In step 450, the first source 190 can transmit the first signal 115, now in the third color space, to the first input 105. Within the controller 150 the first signal 115, in the third color space can be combined with the second signal 125, in the second color space. In one or more embodiments, the combined first signal and second signal can be displayed on the one or more display devices 280 in step 455.

The systems and methods described herein (e.g., systems 100 and 200, and methods 300 and 400) can be implemented in software, hardware, or any combination thereof. In one or more embodiments, these systems and methods can be implemented in hardware, including, but not limited to, a programmable logic device (PLD), programmable gate array (PGA), field programmable gate array (FPGA), an application-specific integrated circuit (ASIC), a system on chip (SoC), and a system in package (SiP). In one or more embodiments, the systems and methods disclosed herein can be implemented in software that is stored in a memory and that is executed by a suitable microprocessor, network processor, or microcontroller situated in a computing device. This executable code can be embodied in any computer-readable medium for use by or in connection with a processor.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A system for color space matching a plurality of signals comprising:
    a first input (105) operably connected to a first source (190), the first input operable to receive a first signal (110) having a first color space format;
    a second input (120) operably connected (125, 130) to a second source (195), the second input operable to receive a second signal (125) having a second color space format;
    a switch (140) operatively coupled to the first input and the second input;
    a controller (150) operatively coupled to the switch, the controller having a plurality of display modes;
        wherein each display mode is associated with a unique External Device Identification ("EDID") data structure, thereby providing a plurality of unique EDID data structures;
        wherein the plurality of unique EDID data structures are disposed in, on, or about an EDID module (155) operatively coupled to the switch;
        wherein the EDID module selects a single unique EDID data structure based upon the color space format of the second signal (125); and
        wherein, responsive to the selection of the single unique EDID data structure by the EDID module, the first source converts the first color space format to a third color space format; and
    a display output (165) operably coupled to the controller;

wherein an sRGB EDID data structure is selected when the first color space format is selected from the group of color space formats consisting of: an sRGB color space and a YUV color space; and wherein an xvYcc EDID data structure is selected when the first signal is in xvYcc color space format;

providing a second signal (125) having a second color space format from a second signal source (195) to a second input (120);

wherein the second input is operatively coupled to the HDMI switch;

wherein the second signal source is disposed in, on, or about the computer housing;

wherein one or more sRGB to xvYcc conversion charts are disposed in, on, or about the second signal source; and wherein the second color space format is an xvYcc color space format when the xvYcc data structure is selected.

2. The system of claim 1, wherein the second color space format comprises the xvYcc color space format, and wherein the third color space format comprises the xvYcc color space format.

3. The system of claim 2, wherein one or more sRGB to xvYcc color space conversion matrices are disposed in, on, or about the first source and wherein the first color space format is sRGB.

4. The system of claim 1, wherein the second color space format comprises an sRGB color space format.

5. The system of claim 1, wherein the first source is a computing device and wherein the single unique EDID data structure is transmitted to the first source via a Display Data Channel (DDC).

6. The system of claim 1, wherein the switch comprises the High Definition Multimedia Interface (HDMI) compatible switch.

7. The system of claim 1, wherein the display device comprises a liquid crystal display (LCD) and the controller comprises a flat panel controller.

8. The system of claim 1, wherein the second source comprises an HDMI signal source.

9. A method for color space matching a plurality of signals comprising:

providing a first signal (110) having a first color space format from a first source (190) to a first input (105);

providing a second signal (125) having a second color space format from a second source (195) to a second input (120);

introducing the first signal and the second signal to a switch (140) operatively connected to the first and second inputs;

operatively connecting a controller (150) to the switch, the controller having a plurality of display modes;

associating each display mode with a unique Extended Display Identification ("EDID") data structure, thereby providing a plurality of unique EDID data structures;

disposing the plurality of unique EDID data structures in, on, or about an EDID module (155) operatively connected to the switch;

operatively coupling the controller to a RAM module (170), the RAM module having one or more color space flags disposed therein;

selecting single unique EDID data structure based upon the second color space format;

setting the corresponding color space flag within the RAM module;

transmitting the color space flag status to the first source; and converting the first color space format to a third color space format within the first source in response to the presence of the color space flag; and displaying a signal comprising the third signal and the second signal on one or more display devices (280) operatively coupled to the controller;

wherein an sRGB EDID data structure is selected when the first color space format is selected from the group of color space formats consisting of: an sRGB color space and a YUV color space; and wherein an xvYcc EDID data structure is selected when the first signal is in xvYcc color space format;

providing a second signal (125) having a second color space format from a second signal source (195) to a second input (120);

wherein the second input is operatively coupled to the HDMI switch;

wherein the second signal source is disposed in, on, or about the computer housing;

wherein one or more sRGB to xvYcc conversion charts are disposed in, on, or about the second signal source; and wherein the second color space format is an xvYcc color space format when the xvYcc data structure is selected.

10. The method of claim 9, wherein the first color space format is selected from the group consisting of: YUV, RGB, and sRGB; wherein the second color space format is selected from the group consisting of xvYcc and high color xvYcc; and wherein the third color space format is selected from the group consisting of xvYcc and high color xvYcc.

11. The method of claim 9, wherein the transmitting of the color space flag comprises transmitting the color space flag status using a channel selected from the group consisting of a Display Data Channel ("DDC") and an Extended-Display Data Channel ("E-DDC").

12. The method of claim 9, wherein the converting of the first color space to the third color space comprises using, in whole or in part, one or more color space conversion matrices disposed partially or completely in, on, or about the first source.

13. The method of claim 12, wherein the one or more color space conversion matrices comprise one or more color space conversion matrices selected from the group consisting of: an RGB to xvYcc color space conversion matrix; an sRGB to xvYcc color space conversion matrix; an RGB to high color xvYcc color space conversion matrix; and an sRGB to high color xvYcc color space conversion matrix.

14. The method of claim 9, wherein displaying the signal comprising the third signal and the second signal comprises providing a visual image on one or more display devices selected from the group of display devices consisting of: a liquid crystal ("LCD") display device; a gas plasma display device; a light emitting diode ("LED") display device; an organic-LED ("OLED") display device; a cathode ray tube ("CRT") display device; and a surface conduction electron-emitter ("SED") display device.

15. A method for color space matching a plurality of signals comprising:

providing a first signal (110) having a first color space format from a first signal source (190) to a first input (105);

wherein the first input is operatively coupled to a High Definition Multimedia Interface ("HDMI") switch (140) disposed in, on, or about a housing (290); and wherein the first signal source (190) is disposed remote from the housing;

operatively coupling a video controller (150) having a plurality of display modes to the HDMI switch;

wherein the video controller is disposed in, on, or about the housing; and wherein the controller is operatively coupled to one or more displays (280) disposed in, on, or about the housing;

operatively coupling an Extended Display Identification ("EDID") module (155) to the HDMI switch;

wherein each video controller display mode is associated with one or more unique Extended Display Identification ("EDID") data structures, thereby providing a plurality of unique EDID data structures disposed in, on, or about the EDID module;

selecting a single EDID data structure from the plurality of EDID data structures based upon the first color space format;

wherein the EDID data structure is transmitted from the EDID module to the HDMI switch;

wherein the EDID data structure is transmitted from the HDMI switch to the second signal source via a Display Data Channel (DDC);

wherein an sRGB EDID data structure is selected when the first color space format is selected from the group of color space formats consisting of: an sRGB color space and a YUV color space; and wherein an xvYcc EDID data structure is selected when the first signal is in xvYcc color space format;

providing a second signal (125) having a second color space format from a second signal source (195) to a second input (120);

wherein the second input is operatively coupled to the HDMI switch;

wherein the second signal source is disposed in, on, or about the computer housing;

wherein one or more sRGB to xvYcc conversion charts are disposed in, on, or about the second signal source; and wherein the second color space format is an xvYcc color space format when the xvYcc data structure is selected.

\* \* \* \* \*